United States Patent
Diester et al.

(10) Patent No.: US 12,070,151 B2
(45) Date of Patent: Aug. 27, 2024

(54) METHOD AND DEVICE FOR PRODUCING MILK-AIR EMULSIONS

(71) Applicant: MELITTA PROFESSIONAL COFFEE SOLUTIONS GMBH & CO. KG, Minden (DE)

(72) Inventors: Thomas Diester, Bückeburg (DE); Bernd Buchholz, Rahden (DE)

(73) Assignee: MELITTA PROFESSIONAL COFFEE SOLUTIONS GMBH & CO. KG, Minden (DE)

(*) Notice: Subject to any disclaimer, the term of this patent is extended or adjusted under 35 U.S.C. 154(b) by 848 days.

(21) Appl. No.: 17/273,136

(22) PCT Filed: Aug. 20, 2019

(86) PCT No.: PCT/EP2019/072234
§ 371 (c)(1),
(2) Date: Mar. 3, 2021

(87) PCT Pub. No.: WO2020/048765
PCT Pub. Date: Mar. 12, 2020

(65) Prior Publication Data
US 2021/0321817 A1    Oct. 21, 2021

(30) Foreign Application Priority Data

Sep. 4, 2018 (DE) ............ 10 2018 121 567.3

(51) Int. Cl.
*A47J 31/44* (2006.01)
(52) U.S. Cl.
CPC .............................. *A47J 31/4485* (2013.01)
(58) Field of Classification Search
CPC .................................................. A47J 31/4485
See application file for complete search history.

(56) References Cited

U.S. PATENT DOCUMENTS

| 2003/0232115 A1* | 12/2003 | Eckenhausen | A47J 31/461 426/477 |
| 2013/0145936 A1* | 6/2013 | Dollner | A47J 31/4489 99/323.1 |

(Continued)

FOREIGN PATENT DOCUMENTS

| CH | 705720 A2 | 5/2013 |
| CH | 711865 A2 | 6/2017 |

(Continued)

OTHER PUBLICATIONS

German Search Report in corresponding German Patent Application No. 102018121567.3, mailed Jun. 13, 2019, English Google Translation, 13 pages with Translation. corresponding International Patent Application No. PCT/EP2019/072234, mailed Translation, 25 pages with Translation.

(Continued)

*Primary Examiner* — Sean M Michalski
(74) *Attorney, Agent, or Firm* — FisherBroyles, LLP; Robert Kinberg

(57) ABSTRACT

A method for operating an apparatus for providing a milk-air emulsion. The apparatus includes: a milk line through which milk flows, a mixing chamber disposed in the milk line, an air feed system having an adjusting unit responsive to a control variable for setting an amount of air injected into the mixing chamber for producing the milk-air emulsion, a measuring unit for determining a physical material property of the milk-air emulsion, and a control and evaluation unit to set the control variable. In a first operating mode an amount of air, controlled by the adjusting unit, is introduced into the mixing chamber to produce the air-milk emulsion which is thereafter is dispensed. In a second operating mode a self-adjustment is performed in which the control and evaluation unit creates a data set as a function of the physical (Continued)

material property of the milk-air emulsion and generates the control variable based on the data set that is input to the adjusting unit.

13 Claims, 5 Drawing Sheets

(56) References Cited

U.S. PATENT DOCUMENTS

| | | | | |
|---|---|---|---|---|
| 2017/0367525 | A1* | 12/2017 | Buchholz | A23C 9/1524 |
| 2020/0077833 | A1* | 3/2020 | Koller | A47J 31/4496 |
| 2020/0146502 | A1* | 5/2020 | Steiner | A47J 31/4489 |
| 2020/0270114 | A1* | 8/2020 | Merati | B67D 1/0888 |
| 2021/0030194 | A1* | 2/2021 | Tessicini | A47J 31/52 |

FOREIGN PATENT DOCUMENTS

| | | |
|---|---|---|
| DE | 102014105108 A1 | 10/2014 |
| DE | 102014112178 A1 | 3/2016 |
| DE | 102017113832 A1 | 12/2017 |
| DE | 102016123655 A1 | 6/2018 |
| EP | 3181021 A1 | 6/2017 |
| EP | 3222178 A1 | 9/2017 |
| EP | 3260025 A1 | 12/2017 |

OTHER PUBLICATIONS

International Search Report in corresponding International Patent Application No. PCTIEP20191072234, mailed Nov. 11, 2019, English Google Translation, 25 pages with Translation.

* cited by examiner

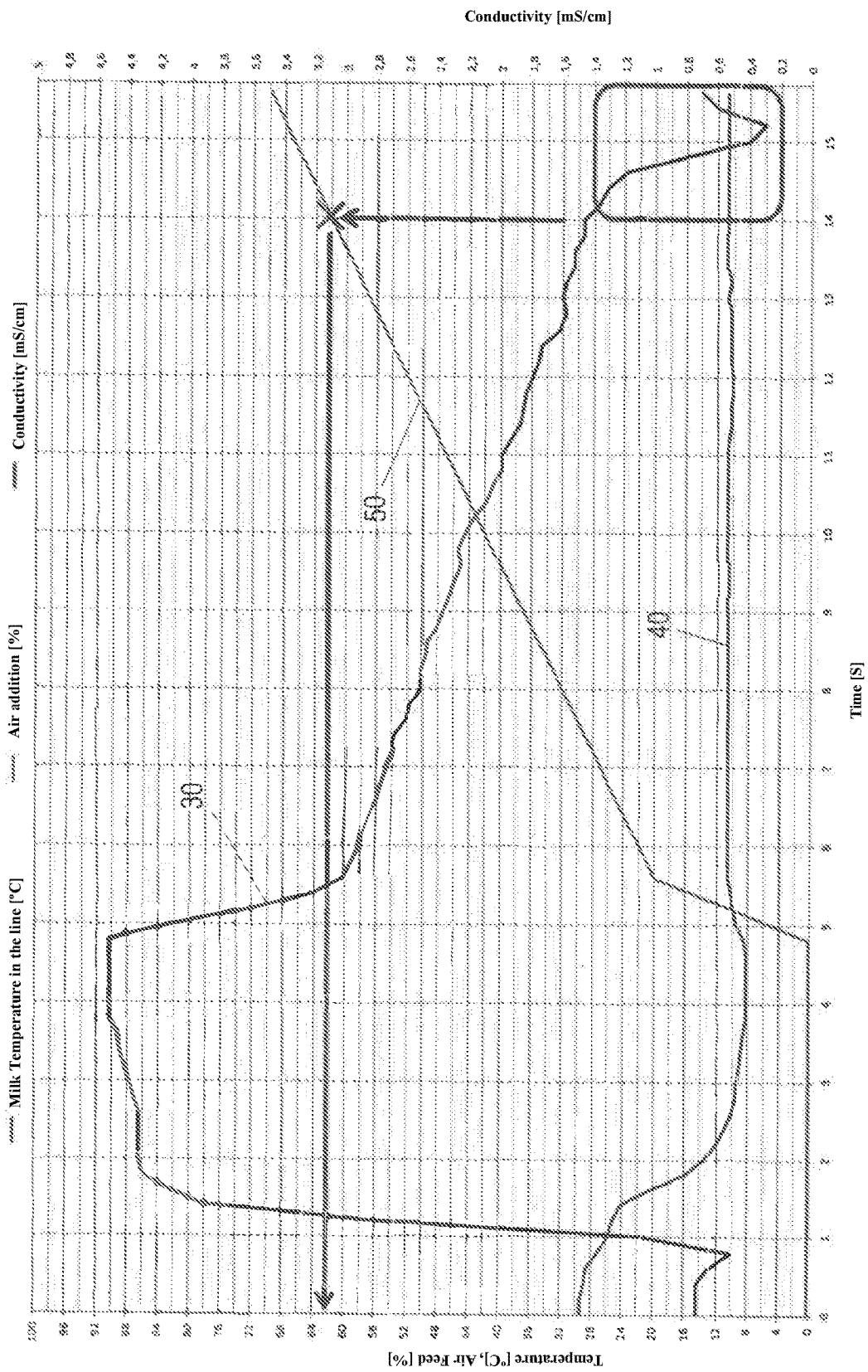

METHOD AND DEVICE FOR PRODUCING MILK-AIR EMULSIONS

CROSS REFERENCE TO RELATED APPLICATIONS

This application is a United States National Stage Application of International Application No. PCT/EP2019/072234 filed Aug. 20, 2019, claiming priority from German Patent Application No. 10 2018 121 567.3 filed Sep. 4, 2018.

FIELD OF THE INVENTION

The invention relates to a method and a device for producing milk-air emulsions, preferably milk foams.

In the production of milk-based beverages with milk foams, different qualities of milk foams can significantly influence the taste of the beverage and the visual appearance of the beverage. To this end, the applicant has already made a number of improvements to a device for producing milk foams.

BACKGROUND

DE 10 2014 105 108 A1 discloses, for example, a homogenizer which optimizes the milk foam on the basis of impact bodies on which the milk foam hits.

DE 10 2014 112 178 A1 discloses an air feed system with an intake device for air and a throttle for the targeted delivery of air into milk with the aim of automated frothing of the milk.

A generic prior art is disclosed in CH 705 720 A2, in which it is proposed to generate milk foam—i.e. a milk-air emulsion—depending on the determined product temperature.

It is also known that the properties of the milk foam and the function of the milk system depend to a decisive extent on the amount of air added to the milk. The optimum air feed is essentially dependent on the milk foam product to be produced (hot milk foam, cold milk foam, top foam), the milk temperature, the type of milk, the suction height and the customer-specific requirements.

With conventional systems, the amount of air for the respective milk foam product must be manually adjusted to the influencing factors and then adapted to the customer-specific requirements. The adjustment is made by the service technician, who uses the trial-and-error method to change the air addition until the optimum setting range can be estimated and then adjusts the foam to the customer's requirements within this range. The time required and milk loss can be high with this procedure, depending on the prevailing conditions and requirements set.

DE 10 2017 113 832 A1 further discloses a method for producing milk-air emulsions, in particular milk foams, using a device for producing a milk foam, wherein the method comprises at least the following steps: A) Determining a physical material property of the milk-air emulsion by at least a first measuring unit; B) carrying out a comparison with the control and evaluation unit between an actual value and a setpoint range of this physical material property, wherein the control and evaluation unit uses a data memory in which data sets of setpoint values and/or setpoint ranges are stored as a function of the temperature and/or a desired milk-containing beverage and/or a type of milk supplied, C) wherein, if the actual value lies outside the setpoint range, the control and evaluation unit is used to set at least one manipulated variable in the method so that the physical material property is influenced. This method has proven itself, but can lead to a regulation during the respective production, which in turn can change the amount of milk foam produced during the production.

SUMMARY

The invention has an object of providing a method for operating a device for producing milk-air emulsions, which is able to provide an adjustment of a setting range in case of changes of material parameters of the milk or of process parameters for the production of the milk-air emulsions.

The above and other objects are achieved according to the invention wherein there is provided a method for operating an apparatus for providing a milk-air emulsion (MLE), the apparatus at least comprising: a milk line through which milk flows, a mixing chamber disposed in the milk line, at least one air feed system having an adjusting unit for setting an amount of air injected into the mixing chamber for producing the milk-air emulsion (MLE) from the milk (M), at least one measuring unit arranged in the milk line downstream of the mixing chamber for determining at least one physical material property of the milk-air emulsion (MLE), and a control and evaluation unit coupled to the measuring unit and setting at least one control variable, wherein the apparatus has at least first and second operating modes. The method includes operating the apparatus in the first operating mode which includes introducing an amount of air, controlled by the adjusting unit in response to the control variable, into the mixing chamber for producing the air-milk emulsion from the milk and thereafter dispensing the milk-air emulsion via the outlet device; and operating the apparatus in the second operating mode by performing a self-adjustment in which the control and evaluation unit creates a data set as a function of the physical material property of the milk-air emulsion determined by the measuring unit and generates the control variable that is input to the adjusting unit.

The control and evaluation unit may be equipped for setting the control variable, e.g. the degree of opening of a throttle, in particular an air throttle valve, on the basis of the physical material property of the milk-air emulsion, wherein the control and evaluation unit has a data memory on which data sets of at least one setpoint value of the physical material property of a milk-air emulsion are stored as a function of a temperature of the milk-air emulsion.

Accordingly, at the same time as the physical material properties of the substance are measured, the temperature can also be measured, e.g. by a temperature sensor.

In a first operating mode of the device according to the invention, a milk-air emulsion is dispensed. In the first operating mode, the adjustment of the amount of air added to a supplied milk is performed based on the pre-stored data set generated in the second operating mode.

The amount of air added can be adjusted in particular by the degree of opening of a throttle of the air feed system. The amount of air added to the supplied milk or the degree of opening of the throttle is within a fixed setpoint range.

The defined setpoint range is selected from a stored data set of the control variable of an adjusting unit, e.g. the degree of opening of the throttle, which changes with the amount of air added. The data set can be designed as a curve diagram "e.g. degree of opening versus conductivity at constant temperature T1".

The degree of opening and thus the amount of air supplied can be adjusted depending on the physical material properties, e.g. electrical conductivity.

In the second operating mode, the data set is created as part of a self-adjustment, in particular in the manner of a value data set that can be displayed in the manner of a progression diagram.

For self-adjustment, agreed or predetermined reference conditions are created by the device itself by flushing the device with milk and by pre-cooling with milk.

Thereafter, the appropriate setpoint range is determined within which a manual adjustment can be made by the user for each individual preparation of a beverage, particularly in the context of the first operating mode.

Within the first operating mode, there is preferably no need to determine the conductivity or the temperature of the milk foam. Rather, only a control or a setting of the device for generating the respective milk foam takes place. Thus, the optimum degree of air feed (for foam generation) and/or steam (for temperature adjustment) for the respective type of milk is set on the basis of the parameters which have been determined in the second operating mode. The second operating mode thus corresponds to a type of calibration of the device for a particular type of milk. Preferably, the user can perform this calibration himself without a service technician. If the type of milk is changed, the calibration can be repeated for the new type of milk. During ongoing production, the device is then simply controlled on the basis of the previously determined parameters.

Self-adjustment in the second operating mode makes it possible to determine an optimum setpoint range under reference conditions.

An adjustment is to be distinguished from the calibration, which is only a measurement. The adjustment is performed by measurements and preferably a comparison with pre-stored data and, if necessary, by changing the data so that the preset software data are adjusted.

A self-adjustment process can also be triggered when various structural units of the device according to the invention are replaced, e.g. the air feed unit. And also, during the already mentioned change of the milk type, a self-adjustment process can be triggered.

The triggering of the self-adjustment, i.e. the switching from the first operating mode to the second operating mode, can be initiated by monitoring and can take place automatically. However, and this is particularly preferred, it can also be triggered manually, for example by starting a corresponding self-adjustment program by selecting a menu item on a selection menu of the control device of the device.

It is also conceivable that a change of the milk type or a change of a component unit is detected, e.g. by an RFID system, and triggers a self-adjustment, or that a self-adjustment is initiated during initial start-up under changed conditions.

However, the self-adjustment can also be initiated manually, e.g. by a technician or by a user. Special technical experience is preferably not required here, since the device preferably performs all method steps independently following the initiation of the second operating mode.

The method for preparing a milk-air emulsion therefore comprises at least two operating modes. One operating mode can be used for milk foam preparation in the sense of beverage dispensing or beverage addition. The second operating mode, on the other hand, is executed when no milk foam is required for beverage preparation. It can be activated, for example, when a type of milk is changed, for example after several weeks, months or even years.

In this context, the milk foam preparation in the first operating mode may preferably comprise the following steps:

Step A: Presetting of a milk-air emulsion based on a manual selection of a beverage. The presetting can be carried out, for example, by selecting the beverage "cappuccino". The selection of the beverage specifies to the device that at least a top foam, i.e. a milk foam essentially floating on a coffee, is required. The generation of the correspondingly required milk foam can be carried out on the basis of settings determined in the second operating mode by the self-adjustment for the specific milk foam product.

Step B: Execution of the first operating mode. If a milk-air emulsion is required for a selected product on an automatic beverage dispenser, e.g. on a fully automatic coffee machine, a control panel can optionally be enabled once for a withdrawal or also recurrently. This control panel preferably indicates to the user the optimum setpoint setting for the milk-air emulsion and allows the user to vary the composition of the emulsion by supplying more or less air within the setpoint range preset by self-adjustment. This option can be run once after a self-adjustment or each time before a beverage is dispensed. In this case, the setpoint range is set using the data set determined or adjusted in the second operating mode.

Step C: Dispensing the beverage with the milk-air emulsion. The composition of the milk-air emulsion corresponds to the composition set by the user in the control panel. Thus, the user is given the option of setting via the control panel without being able to select a composition (90% milk or 90% air) that is far beyond an optimal composition. In addition, the user is informed about the optimal composition of a milk foam, which is now preferably independent of the type of milk due to the self-adjustment, and he can set according to "feeling" whether he prefers a denser or "looser or fluffier" milk foam compared to the product specified as optimal.

The data set can advantageously be designed as a progression diagram or progression data set for the progression of the physical material property as a function of the air feed, i.e., for example, as a function of the degree of opening of a throttle of the air feed system, and/or the milk foam and/or milk temperature, i.e., as a data set or as a value function that depends on one or more variables, for example air feed and/or temperature and possibly other variables.

The second operating mode may comprise at least the following steps:
(i) analysis of a supplied milk at least on the basis of the physical material property of the substance;
(ii) repeatedly forming a milk-air emulsion while changing an amount of air introduced into the milk while determining the change or respective value of the physical material property of the substance; and
(iii) plotting a progression diagram for the physical material property as a function of the amount of air adjusted in step (ii).

The amount of air introduced in step ii) can be expressed indirectly via a degree of opening of the throttle when using an air intake system with an adjustable throttle. The amount of air or the degree of opening is gradually increased or decreased, starting from a starting value, in particular to create the data set.

The self-adjustment is to be understood in particular as a method for the automatic autonomous determination of one or more control parameters, in particular the amount of air added, when generating a milk froth. This method can be carried out as a completely independently performed method or operation. For example, it can also take place when the device is started up and/or be started manually. The optimum air intake quantity for the respective milk foam product can be determined automatically on a milk-specific and foam-specific basis and stored as a data set. This data set is then used automatically or, if necessary, after adjustments by the user for the control in the first operating mode.

A large number of physical material properties depend on reference conditions for their metrological recording or determination. An important reference condition is the temperature of the milk or the air-milk emulsion, e.g. when determining the electrical conductivity.

It is therefore advantageous if the determination of the physical material property in step ii) is carried out as a function of the temperature of the air-milk emulsion. If a temperature change occurs during a stepwise change of the air or during the change of the opening degree of the throttle, a temperature compensation can be carried out during the creation of the data set on the basis of a stored temperature conductivity data set.

It is also advantageous if the amount of air is supplied via a throttle, preferably by means of a motor-driven continuously adjustable air throttle valve, which can be controlled by adjusting the setpoint range, wherein the amount of air is indicated in the progression diagram on the basis of the degree of opening of the throttle. In particular, the throttle is part of the air feed system.

Prior to the analysis of the supplied milk, the device can be rinsed with the milk for cleaning and/or for pre-cooling individual components of the device. This creation of reference conditions, together with the analysis of the milk supplied, can represent a method step in the self-adjustment procedure.

The electrical conductivity and/or an optical material property, in particular the refractive index, can advantageously be used as a physical material property. This means that the milk/foam ratio can be measured and evaluated on the basis of the electrical conductivity or the refractive index (BRIX).

Switching between the first and the second operating mode can advantageously be carried out by manual switching, preferably triggered by an access-protected adjustment menu or as a result of monitoring.

The access-protected adjustment menu can, for example, only be unlocked and operated by a technician or a specific user via password, RFID or other key systems.

The analysis of the milk supplied in step i) can be carried out on the basis of a milk-type database, wherein different milk types, e.g. by manufacturer and/or by fat content or other parameters such as freedom from lactose, are stored as a data set on the data memory of the control and evaluation unit as a function of the physical substance unit, e.g. conductivity, and/or physical properties such as the temperature of the milk.

Based on this milk-type database, a redundancy check of the milk analysis in step i) can be performed and/or a monitoring of the milk type can be performed, wherein a change of the milk type can lead to an initiation of the second operating mode.

Furthermore, depending on the type of milk, a different optimum setpoint range can be selected.

The second operating mode also enables or realizes the automatic co-inclusion of secondary/passive factors influencing the foam properties (geodetic suction height, milk temperature, line length, milk assortment and milk type) and the corresponding compensation of these by the air intake quantity.

Overall, according to the invention, the second operating mode also results in a very advantageous possibility to react to changed conditions (milk type, milk temperature or similar) by the user or by remote maintenance.

In the context of the present invention, the method and/or device according to the invention can be used in an appliance for dispensing, and in particular also for preparing, a milk-containing beverage, in particular a milk-containing coffee beverage. A corresponding apparatus is preferably designed as a fully automatic coffee machine.

BRIEF DESCRIPTION OF THE DRAWINGS

In the following, the invention is described in more detail with reference to the drawing by means of an exemplary embodiment, wherein:

FIG. 7 shows another diagram in the manner of FIGS. 2 and 3.

DETAILED DESCRIPTION

Above and in the following, the terms "milk-air mixture" and "milk-air emulsion" and "milk foam" are used synonymously.

Figure 1:
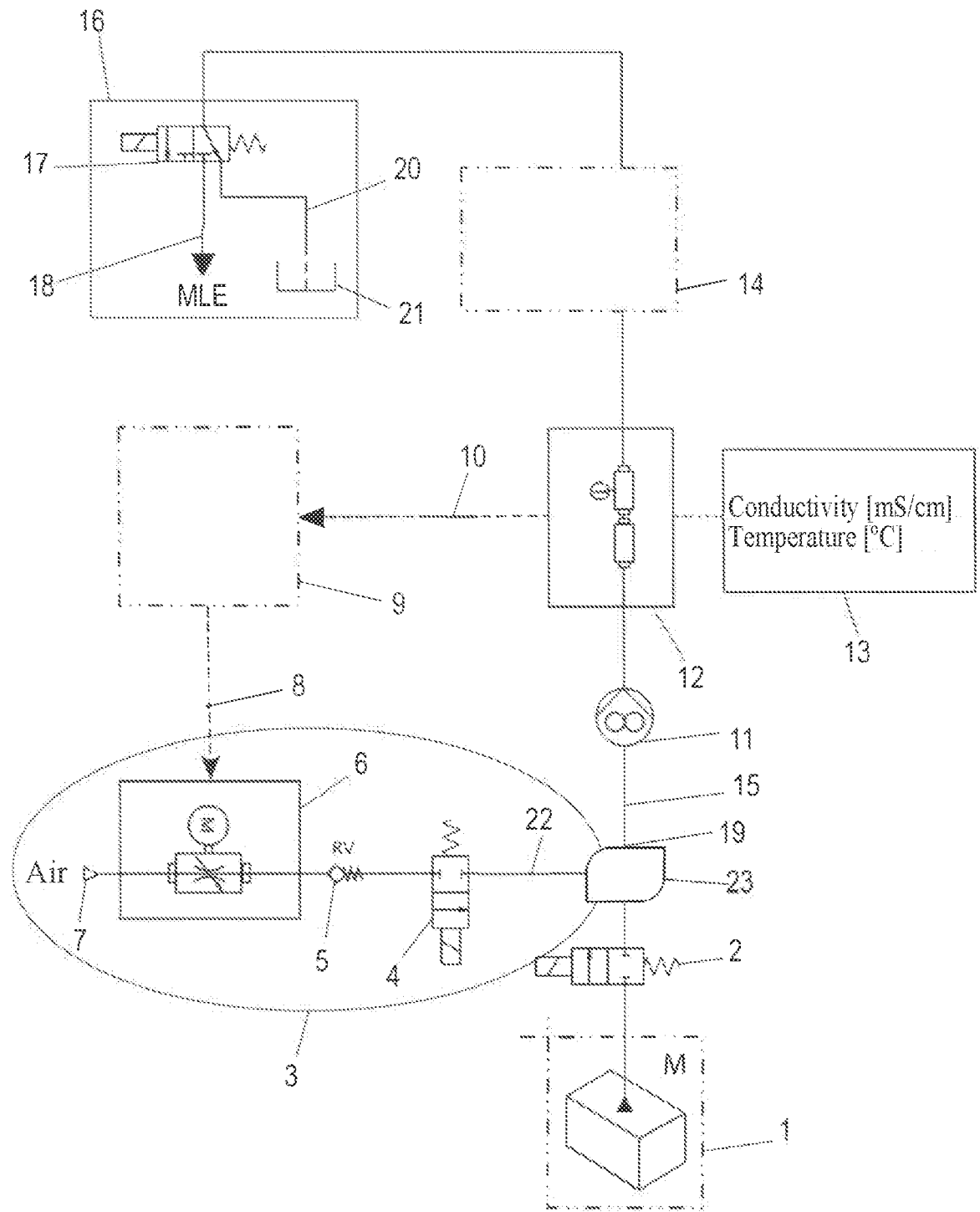
FIG. 1 shows a schematic representation of the structure of a first device according to the invention for producing milk-air emulsions, in particular milk foam.

FIG. 1 shows a device for producing milk foam. This has the following exemplary structure:

A milk line 15 connects a milk container 1 with milk M and an outlet device 16 for a milk-air emulsion MLE. The outlet device 16 is designed as an outlet under which a vessel such as a cup can be placed. In the following, the terms outlet device 16 and outlet are used synonymously. In this case, the following components are connected in the milk line 15 between the milk container 1 and the outlet device 16 in this order here: a shut-off valve 2, a milk pump 11, an air feed system 3, a measuring unit 12, a processing device 14.

The air feed system 3 has an air line 22 and possibly a mixing chamber 23. The milk is fed into this mixing chamber 23 via the milk line 15. Foaming is carried out by the introduction of air. The air feed can be connected to an air source 7 (e.g. an air pump or a pressurized container or a non-pressurized container or through an opening or a line end (suction) to the ambient air inside or outside a surrounding machine).

A check valve 5 and a shut-off valve 2 are connected here in or on the air line 22 between the mixing chamber 23 and the air source 7. In addition, an adjusting unit 6 is arranged along the air line between the check valve 5 and the air source 7. This allows the air pressure at which the air is blown into the milk through the air line 22 to be set.

Furthermore, a shut-off valve 4 is provided between the check valve 5 and the point of introduction 19 of the air into the milk line 15, here in the area of the mixing chamber 23.

When air is introduced, the milk can be foamed, or a milk-air emulsion is formed.

The adjusting unit 6 receives a control command from a control and evaluation unit 9, which is transmitted to the adjusting unit 6 via a signal line 8. The signal line 8 can, for example, be designed as a cable or as a wireless connection.

The measuring unit 12 measures/determines, among other things, measurement data for determining a physical material property 13, preferably the electrical conductivity and/or the optical material property, and other measurement variables such as temperature.

This material property changes with the quality of the milk foam, in particular the ratio of air to milk per cubic centimeter of milk foam.

One such physical material property 13 can be the electrical conductivity, which is particularly preferred. The value of the electrical conductivity correlates to the proportion of air in the milk foam. In addition to electrical conductivity, however, thermal conductivity, density and/or viscosity can also be determined. An optical material property, in particular the refractive index, can also be determined. For this purpose, the measuring unit 12 preferably has a corresponding sensor, for example a conductivity measuring cell or a refractometer, for example in a measuring cell. Further preferably, the measuring unit 12 may comprise a temperature sensor for temperature compensation of the determined conductivity. In addition, preferably and advantageously, the temperature of the milk emulsion or the milk-air emulsion can be adapted to a setpoint value by regulating the amount of cold air supplied and/or by pre-cooling by cold milk.

The measuring unit 12 is connected to the control and evaluation unit 9 via a signal line 10, e.g. a cable line or a wireless data line, and passes on the measured values to this control and evaluation unit 9. This unit can determine the corresponding material property as the first actual value from the measured data and then compare this with a predefined setpoint value of a setpoint value range.

A processing device 14 may have one or more heating units for heating milk directly or indirectly, for example by introducing steam or by heating through a heat exchanger.

According to one variant, hot, warm and cold milk and/or hot, warm and cold milk foam can be dispensed (temperature gradation hot>warm>cold).

The device for generating/preparing milk foam can be part of a higher-level automatic beverage dispenser, for example a fully automatic coffee machine.

According to one variant, for example, two milk foams of different temperatures can be added to an initially provided coffee, or the two milk foams of different temperatures are first provided and then a coffee is added. These can be, for example, a top foam (warm milk foam), a hot milk foam and/or a cold milk foam.

In known fully automatic coffee machines, the consistency of the milk foam, and here primarily the formation of the air bubbles, is often very irregular. A homogenizer can be used to even out the milk foam produced.

Most physical material properties are temperature-dependent material properties. For example, electrical conductivity is dependent on temperature and air content.

In the context of the invention, it is therefore very well suited as a measurement and control variable for influencing the milk foam properties.

The aforementioned air feed system 3 is preferably used to supply air according to a method comprising the following steps:

The throttle or an air throttle valve is to be understood as an embodiment of an adjusting unit 6.

According to the invention, the opening cross-section of the throttle can be adjusted according to the conductivity and/or according to the desired temperature of the milk foam.

A throttle, also called an air throttle valve, which is designed to be continuously adjustable with regard to the size of its opening cross-section, in particular by means of an electric motor, is referred to below as an adjustable throttle.

For the setting of the opening cross-section of the adjustable throttle, an electric motor can preferably be used. An adjustable throttle, such as may preferably be provided as an adjusting unit 6 in the present invention, may thereby also have a quasi-stepless adjustment, which is made possible, for example, by a stepping motor.

Alternatively, or in addition to controlling the supplied amount of air, the control and evaluation unit 9 can also preferably control the delivery and pump volume of the milk pump 11 as a function of the physical material property, in particular electrical conductivity. The consistency of the milk foam can also be changed in this way.

By using an adjustable throttle as an adjusting unit in combination with the possibility of controlling the various heating units, the amount of air supplied can be adjusted as a function of a physical material property, in particular as a function of the conductivity and temperature of the milk-air mixture produced.

The outlet device 16 may include a diverter valve 17 that transports the milk-air mixture or milk to either the discharge nozzle 18 consisting of one or more discharge nozzles or a discharge line 20 for disposal of the product into the drain 21.

It is possible to react to the essential factors or a change in one or more of these factors by adjusting the amount of air, based on a predefined milk-air ratio.

In the device of FIG. 1 according to the invention, which can determine and automatically influence the milk-air ratio, the air addition can be adjusted to essential influencing factors with an automatic independent adjustment process, and an optimum range for the subsequent customer-specific adjustment can be defined automatically without manual intervention.

The device of FIG. 1 has at least two operating modes with a first operating mode for preparing a single beverage or a product-specific and/or user-specific milk foam. Furthermore, the device has the second operating mode which is also referred to as self-adjustment in the context of the present invention.

Other operating modes, e.g. cleaning modes, and the like can of course also be present.

Preferably, the operating modes on a beverage dispenser are started by confirming or actuating a menu item of a selection menu or by other input.

The optimum amount of air is determined by measuring the physical material unit by means of the measuring point 12, and the adjusting unit 6, preferably in the form of a motorized, continuously adjustable throttle, is provided to influence the air addition. The aim is to find an air addition range within which a largely optimum milk-air ratio can be produced.

In the first step, milk is conveyed through the device without the addition of air, e.g. to dispose of rinsing water, to cool components, to detect the presence of milk, to assess the type of milk and/or as a result to create stable initial conditions for the next step.

In the second step, milk is conveyed through the device at the corresponding product pump speed of the milk pump 11, and at the same time the air feed is automatically increased. The milk-air ratio is measured continuously during the process.

An advantageous parameter for defining the addition range is the air addition amount (opening cross-section or position of the adjusting unit 6). The amount of air (percentage opening) at which a predefined milk-air ratio is achieved serves as an orientation value for the addition range in which the system can be adapted to customer-specific requirements. The predefined milk-air ratio is reached when the conductivity measurement reaches a certain value, which can be stored as a data set on the control and evaluation unit 9.

It can also be advantageously further provided that in addition to the orientation value the value is stored at which preparation is no longer possible due to the addition of too much air or at which the foam quality is no longer acceptable due to too large air bubbles. In the progression diagram, this limit value is represented as a rapid/steep decrease in conductivity. In the attached progression diagram, this occurs from a conductivity of 1.4 mS/cm at 62% air addition quantity (second 14). These values can be used to clearly define the optimum setting range within the general function range.

The self-adjustment thus defines an addition range for the supplied amount of air, in particular for the percentage opening of the air throttle valve, which is used as a constant default for a plurality of subsequent preparation processes for beverages.

Self-adjustment is explained again in detail below using a specific example.

Step i: Analysis of the milk. After starting the self-adjustment, in a first step milk is conveyed through the device without air feed, i.e. at an air addition of 0%. This can be carried out, for example, at a milk temperature in ambient temperature (e.g. 20° C.). The conductivity can be 0.7 mS/cm at the beginning of step i.

During step i, milk is conveyed from a container. At the same time, heated milk, rinsing water and air pockets are removed from the device. During this period, the temperature may drop further to 8° C., for example. The conductivity increases until an approximately constant conductivity value is set for the milk (e.g. at 4.5 mS/cm). As long as constant conditions (conductivity and sufficient temperature of the milk and the device) are set, the milk analysis is complete.

The milk analysis can preferably be less than 8 seconds, especially less than 5 seconds.

Step ii: Analysis of milk foam. First, an air addition is activated. This involves opening the throttle, in particular the air throttle valve. Initially, there may be a rapid opening, e.g., 20%. The temperature may increase slightly, e.g. from 8° C. to 10° C. The air feed causes the conductivity to drop, e.g. from 4.5 mS/cm to 3.0 mS/cm.

In addition to the extent of the opening of the throttle, the pump speed of the milk pump can also be adjusted depending on the product settings, i.e. the type of milk foam. The air addition can be increased iteratively, e.g. linearly, within a certain range. In this case, the change of the milk-air ratio is determined by the conductivity measurement during the increase of the air addition. The temperature can be maintained at a constant 10° C. The degree of opening of the throttle can be successively increased from 20% to 70%. The conductivity can thereby decrease from 3.0 mS/cm to 1.2 mS/cm.

After completion of the analysis of the milk foam, a corresponding progression can be displayed in a progression diagram, wherein degree of opening of the throttle versus conductivity can be stored as a data set at a corresponding milk temperature.

When outputting the milk foam, a setpoint value can now be predetermined for each desired milk foam. For example, a top foam can have a different conductivity than a cold milk foam. Depending on the beverage and/or foam selection, a setpoint range can be specified along the diagram. For example, this may be 2 mS/cm for top foam at a milk temperature of 10° C. with a variance of 6%. Accordingly, the setpoint range can be from 1.94 to 2.06 μS/cm and correspondingly, the degree of opening of the throttle within a setpoint range can be between 40 to 52% for top foam according to the determined progression diagram.

Another setpoint range can be predetermined for cold milk foam, e.g. a throttle opening degree between 31 and 43%.

The self-adjustment of the respective milk foam product (hot milk foam, cold milk foam, top foam) can be improved by the procedure described above depending on the milk temperature, the type of milk, but also the suction height and the set-up conditions.

For example, performing the adjustment also allows the air addition to be adjusted when the machine is installed and/or the adjustment to be repeated in response to a change in the main influencing factors, e.g. a change in the type of milk. In particular, the renewed performance of the adjustment process, which can be carried out directly by the customer, represents a significant improvement, since a technician is not required for renewed adjustment after, for example, a change of milk type. In addition, the milk losses that occur during adjustment and the time required for adjustment are greatly reduced.

The subsequent fine adjustment can be made in the determined setpoint range to the customer-specific requirements via the operating element due to the motorized stepless adjustment, thus eliminating the need to dismantle components or similar.

Figure 2:
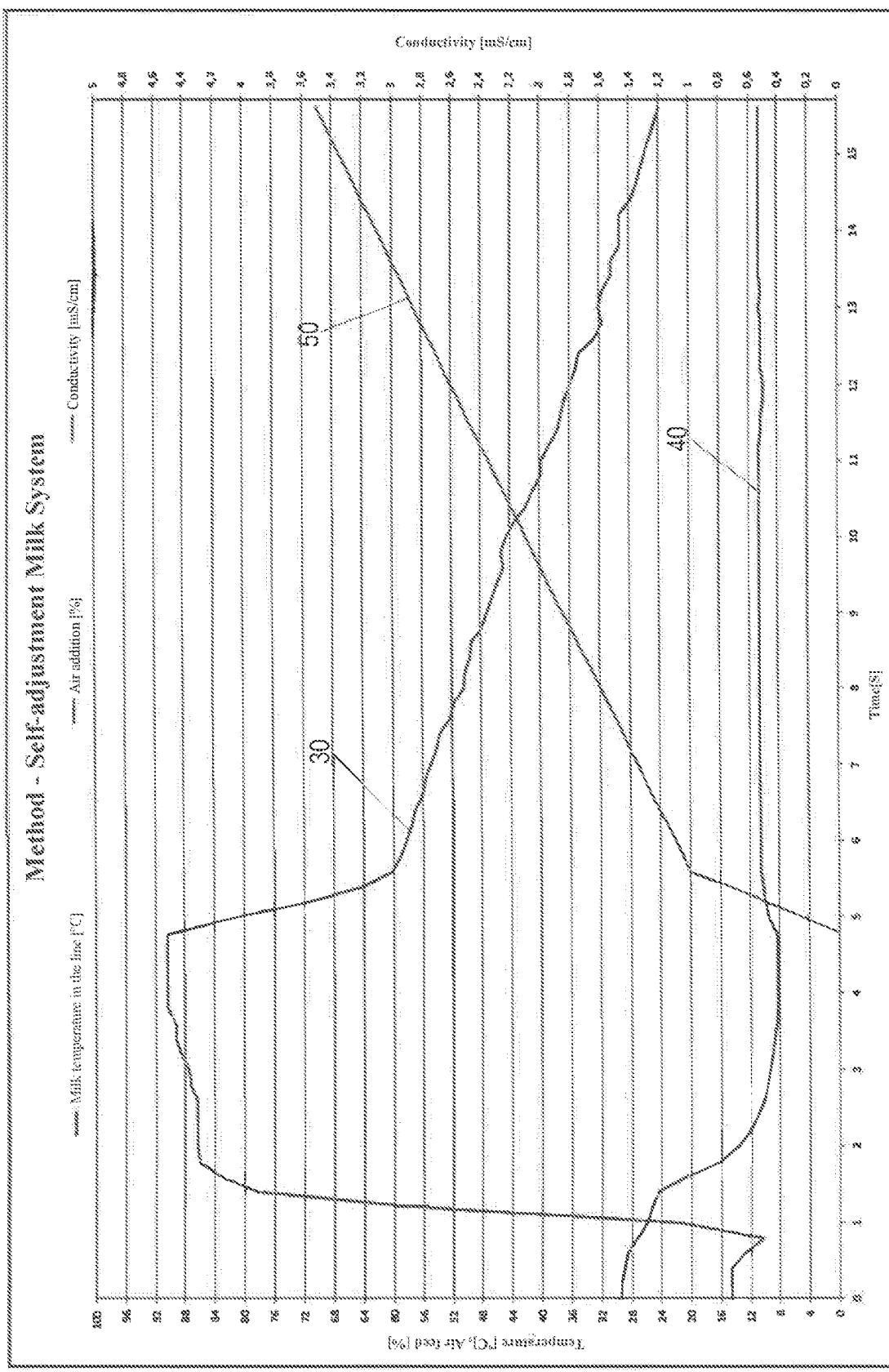
FIG. 2 shows a diagram representing a dependence between the electrical conductivity (graph 30) and the air content in milk (graph 50) and a temperature curve (graph 40).

FIG. 2 shows a schematic example of a dependence between the electrical conductivity (graph 30) and the air content in milk or the degree of opening of the adjusting unit 6, here in the form of the air throttle valve (graph 50) (type of milk: cow's milk, 1.5% fat, UHT)—here exemplarily within a time interval of 15 seconds. The cooling of the device by the supply of cold milk is represented by a temperature curve (graph 40). The graphs correspond to the aforementioned method steps i to iii, wherein it can be read from the temperature ranges and the addition of air which method step is initiated at which time. However, in the variant shown in FIG. 2, a setpoint value of 2.3 mS/cm, which corresponds to a degree of opening of the air throttle valve of 46%, is ideal for the type of milk present and the selected milk foam product, e.g. Top Foam. Based on this degree of opening, different consistencies can be produced, for example, within a target range of +/−6%. This target range can also depend on the type of milk used, the temperature of the emulsion and/or other parameters.

FIG. 1 clearly shows the dependence of the conductivity on the temperature of the milk foam and on the air content of the milk foam. The primary factors influencing the milk foam properties (quality) and consequently the conductivity are the air content and the temperature. Secondary influencing factors are the frame/installation conditions of the machine e.g. geodetic suction height, line lengths as well as milk assortment and type of milk, the indirect influence of these factors leads to variations of the optimal air addition range from installation location to installation location and can be automatically compensated by the second operating mode. Air pressure, temperature, and time period, on the other hand, are rather less suitable active manipulated variables during a withdrawal, since they are usually either predominant or predetermined (ambient temperature at the customer, temperature and position of the refrigerator, cup size). A main manipulated variable of the system is the amount of air added via the adjusting unit.

Figure 3:
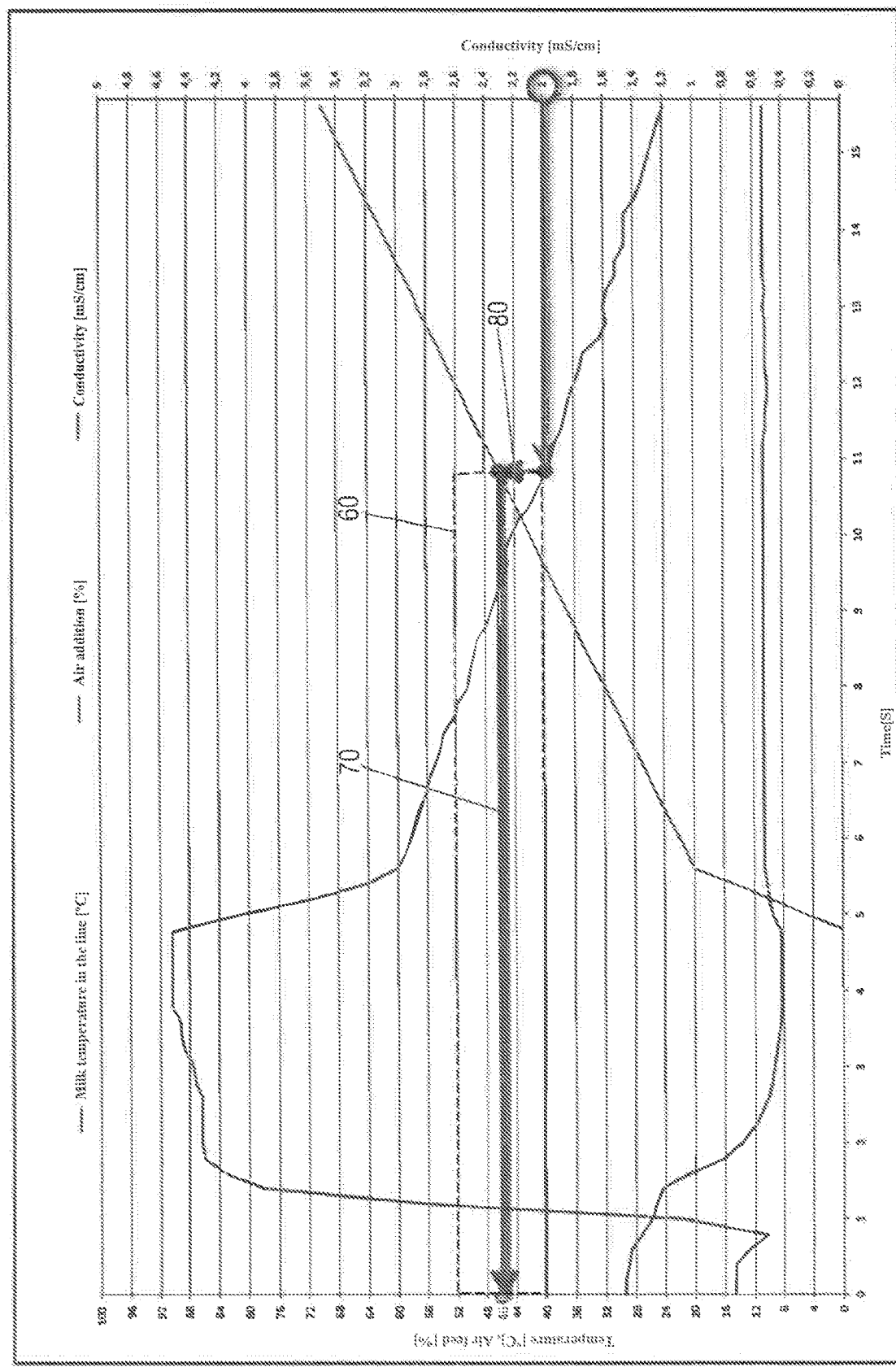
FIG. 3 shows a representation of the diagram in FIG. 3 with a functional area.

Specifically, the aforementioned setpoint range is shown in FIG. 3. The setting of the degree of opening of the air throttle valve by the user during single beverage preparation is thus limited to a range between 40 to 52% in the first operating mode, with the degree of opening of 46% being suggested to the user as a suitable average value for the milk foam of his selected product.

Overall, during the self-adjustment of FIG. 1, the electrical conductivity of milk foam can be used to assess this milk foam and to set limits for influencing the milk foam via the amount of air supplied by the user when dispensing a beverage.

An additional parameter to be advantageously taken into account is the temperature. This is because the conductivity of the milk foam is particularly dependent on the type of milk, the milk temperature and the air content. With the appropriate measurement and knowledge of the conductivity characteristics of different types of milk and temperatures, which can be taken into account in setpoint data sets, among other things, an optimum milk-to-air ratio can be defined for further processing in the process and this can be produced, for example, via automatic regulation of the air feed. The amounts of air can even be individually regulated dynamically during self-adjustment and within the setpoint range during the first operating mode. The regulation can automatically adapt to the internal and external parameters, which basically enables a reaction to the changes in the operating conditions and greatly simplifies the adjustment and calibration of the system. Changes in milk temperature can be compensated to a limited extent by the supply of air.

The measuring units used as described above each preferably comprise a conductivity sensor and a temperature sensor.

Particularly preferably, the first measuring unit 12 is arranged directly on the pressure side of the milk pump 11.

Figure 4:
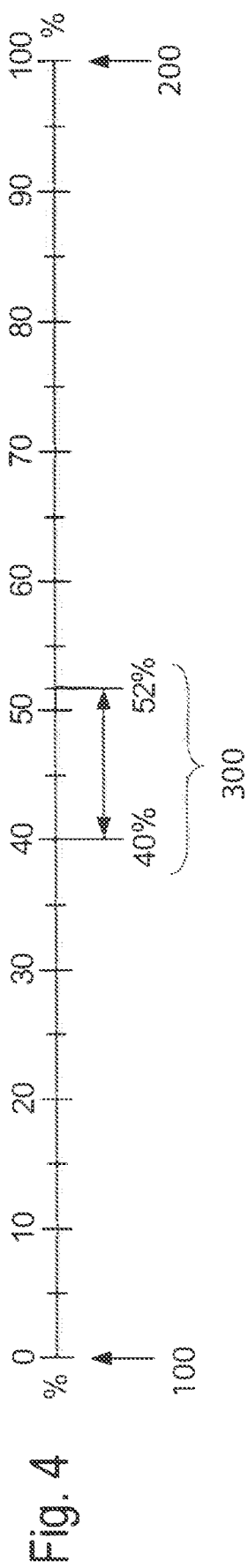
FIG. 4 shows a representation of a functional range with regard to the percentage opening of the air throttle valve.

FIG. 4 shows a definition of the setpoint range on a scale of the degree of opening. The value 100 corresponds to 0% opening of the air throttle valve, so that no air is introduced into the milk. The value 200 corresponds to a 100% opening of the air throttle valve, so that air with high pressure is introduced into the milk. The amount of air is usually too high to form a mechanically stable air-milk emulsion.

The range 300 was determined by self-adjustment in the second operating mode of the device by gradually opening the valve while simultaneously measuring conductivity and measuring or monitoring temperature.

This range 300 is the optimum setpoint range for the milk foam of the particular product selected by the user depending on the type of milk used.

Figure 5:
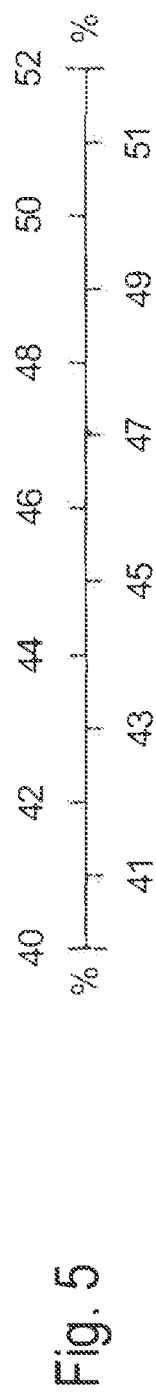
FIG. 5 shows a representation of a function range preset by self-adjustment.
Figure 6:
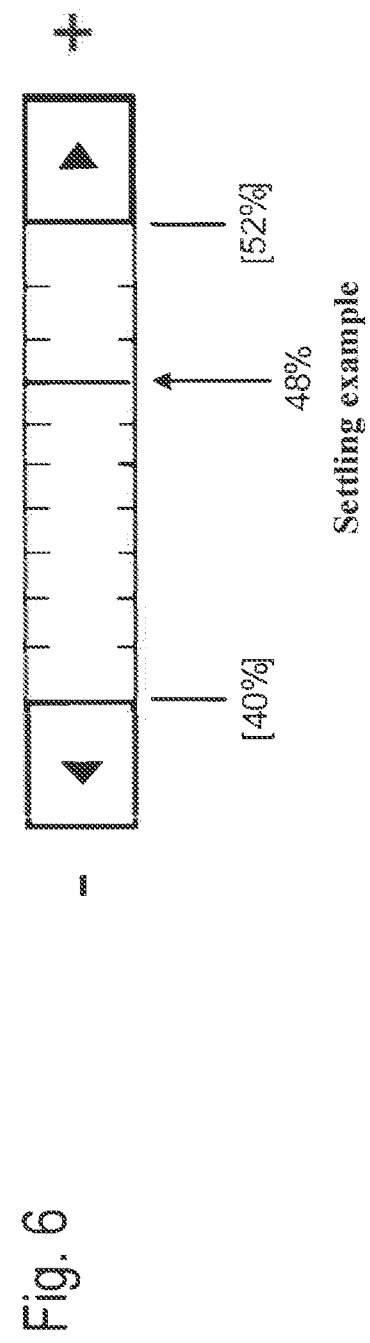
FIG. 6 shows an illustration of a graphic menu control element of a device for preparing a caffeinated beverage.

FIG. 5 is a graphical enlargement of the area 300, and FIG. 6 is a control panel for adjusting the milk foam quality within the area 300 during milk foam preparation after the user selects a beverage as part of a single beverage preparation.

The invention claimed is:

1. A method of operating an apparatus for providing a milk-air emulsion, wherein the apparatus at least includes: a milk line through which supplied milk flows; at least one air feed system having an adjusting unit for setting an amount of air injected into a mixing chamber disposed in the milk line for producing the milk-air emulsion from the supplied milk; at least one measuring unit arranged in the milk line downstream of the mixing chamber for determining at least one physical material property of the milk-air emulsion; and a control and evaluation unit coupled to the measuring unit and setting a control variable that is input to the adjusting unit, wherein the apparatus has at least first and second operating modes; the method comprising:

operating the apparatus in the first operating mode which includes introducing an amount of air, controlled by the adjusting unit in response to the control variable, into the mixing chamber for producing the air-milk emulsion from supplied milk and thereafter dispensing the milk-air emulsion via the outlet device; and operating the apparatus in the second operating mode by performing a self-adjustment in which the control and evaluation unit creates a data set as a function of the physical material property of the milk-air emulsion determined by the measuring unit and generates the control variable, based on the data set, that is input to the adjusting unit.

2. The method according to claim 1, further comprising: in the first operating mode, enabling dispensing a beverage comprising the milk-air emulsion by performing the steps of:

A) presetting the milk-air emulsion based on a manual selection of a beverage;

B) executing the first operating mode while enabling a control panel for a setpoint adjustment of the amount of air within a setpoint range; and C) dispensing the beverage with the milk-air emulsion.

3. The method according to claim 1, including designing the data set as a progression diagram of the physical material property as a function of a degree of opening of a throttle of the adjusting unit of the air feed system.

4. The method according to claim 3, wherein the second operating mode comprises at least the following steps:

i) analyzing the milk supplied at least on the basis of the physical material property;

ii) repeatedly forming a milk-air emulsion while changing an amount of air introduced into the milk while simultaneously detecting a change in the physical material property; and iii) generating the progression diagram for the physical material property as a function of the amount of air in step ii).

5. The method according to of claim 4, comprising carrying out the determination of the physical material property used in the detecting of step ii) as a function of a temperature of the air-milk emulsion.

6. The method according to claim 4, including rinsing the apparatus prior to the analyzing step performed on a same type of milk as the supplied milk for at least one of cleaning and pre-cooling individual components of the apparatus.

7. The method according to claim 4, including carrying out analyzing the milk supplied in step i) on a basis of a milk-type database that includes data of milk assortments stored as a data in a data memory of the control and evaluation unit as a function of the physical material property and a temperature of the milk.

8. The method according to claim 1, comprising carrying out the introducing of the amount of air by setting a setpoint range of a motor-driven continuously adjustable air throttle valve of the adjusting unit.

9. The method according to claim 1, wherein the physical material property comprises at least one of an electrical conductivity and an optical property of the milk-air emulsion.

10. The method according to claim 9, wherein the optical property of the milk-air emulsion is refractive index.

11. The method according to claim 1, including employing manual switching to change between the first and the second operating modes.

12. The method according to claim 1, including triggering a change between the first and the second operating mode as a result of monitoring a change in milk type of the milk supplied to the milk line in the first operating mode.

13. An apparatus for producing milk-air emulsions using the method of claim 1, comprising:
    a milk line through which milk flows;
    a mixing chamber disposed in the milk line;
    at least one air feed system having an adjusting unit for adjusting an amount of air injected into the mixing chamber for producing a milk-air emulsion from the milk as a function of at least one control variable;
    at least one measuring unit arranged in the milk line downstream of the mixing chamber for determining at least one physical material property of the milk-air emulsion;
    a control and evaluation unit coupled to the at least one measuring unit and equipped for setting the at least one control variable and communicating the at least one control variable to the adjusting unit; and
    an outlet device dispose in the milk line downstream of the measuring unit,
    wherein the apparatus has at least first and second operating modes,
    wherein in the first operating mode an amount of air is introduced into the mixing chamber by the adjusting unit to produce the milk-air emulsion in response to the control variable set by the control and evaluation unit and the milk-air emulsion is thereafter dispensed by the outlet device, and
    wherein in the second operating mode a self-adjustment is performed in which the control and evaluation unit creates a data set as a function of the physical material property of the milk-air emulsion determined by the measuring unit and generates the control variable used by the adjusting unit to control the amount of air introduced into the mixing chamber.

* * * * *